United States Patent [19]
Beakes et al.

[11] Patent Number: 5,755,021
[45] Date of Patent: May 26, 1998

[54] STATOR LEAD WIRE CONNECTING METHOD

[75] Inventors: John M. Beakes, Fairborn; Theodore E. Delehanty, Potsdam; Howard S. Hunter, Fairborn; Lawrence E. Newman, Tipp City, all of Ohio

[73] Assignee: Globe Products Inc., Huber Heights, Ohio

[21] Appl. No.: 499,416

[22] Filed: Jul. 7, 1995

[51] Int. Cl.$^6$ ................................................. H02K 15/09
[52] U.S. Cl. ................................... 29/596; 29/732; 29/736; 242/432.2; 242/432.6
[58] Field of Search ........................... 29/596, 597, 598, 29/732, 736; 310/42; 242/432.2, 432.6

[56] References Cited

U.S. PATENT DOCUMENTS

| | | | |
|---|---|---|---|
| 4,951,379 | 8/1990 | Clemenz | 29/597 |
| 5,090,107 | 2/1992 | Beakes et al. | 29/566.3 |
| 5,090,108 | 2/1992 | Banner et al. | 29/596 |
| 5,535,503 | 7/1996 | Newman | 29/596 |

*Primary Examiner*—Carl E. Hall
*Attorney, Agent, or Firm*—Roger S. Dybvig

[57] ABSTRACT

A stator coil lead wire is extended over the end turns of coil from which the lead wire is extended and inserted into a terminal member adjacent the opposite side of the same coil. A tooling assembly is provided having a coil shield which prevents the lead wire from becoming disengaged from the coil end turn and moving toward the center of the stator core. Additionally, a wire guide finger is provided which is movable toward and away from the stator core for enabling the lead wire to be inserted between closely spaced terminal members.

3 Claims, 3 Drawing Sheets

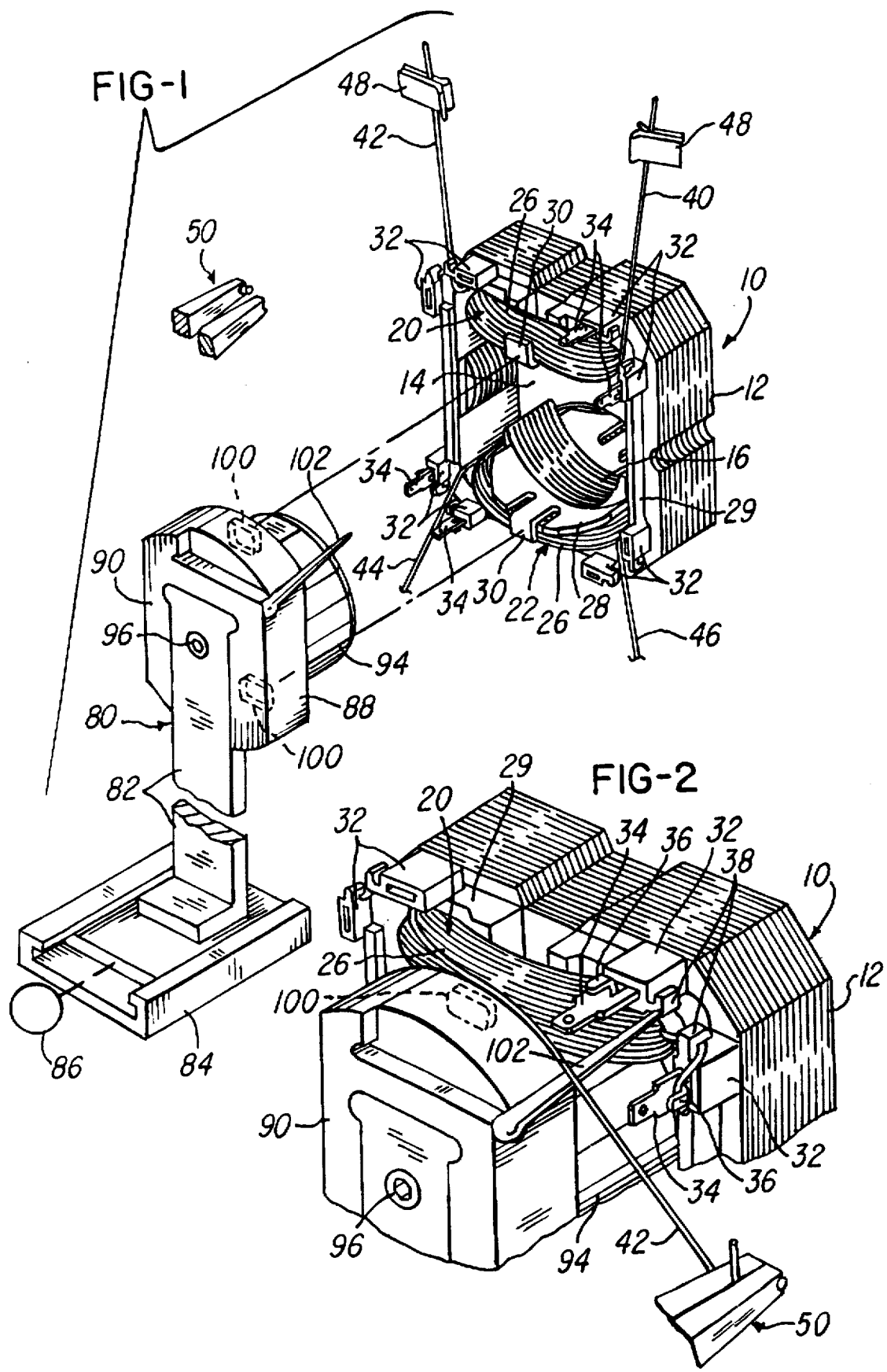

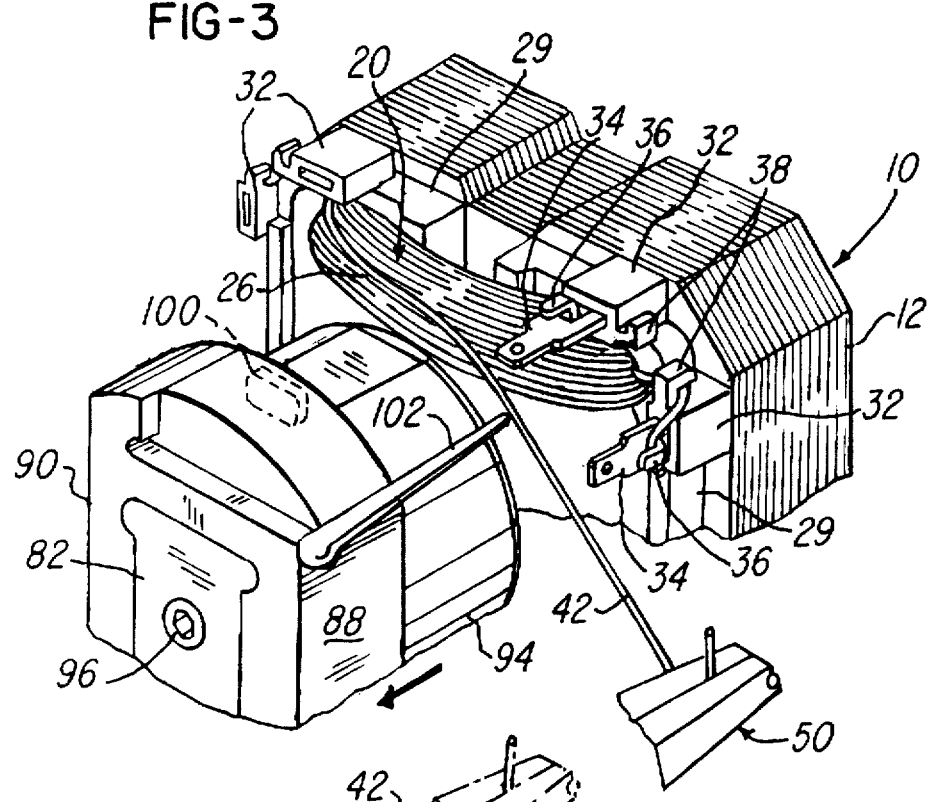
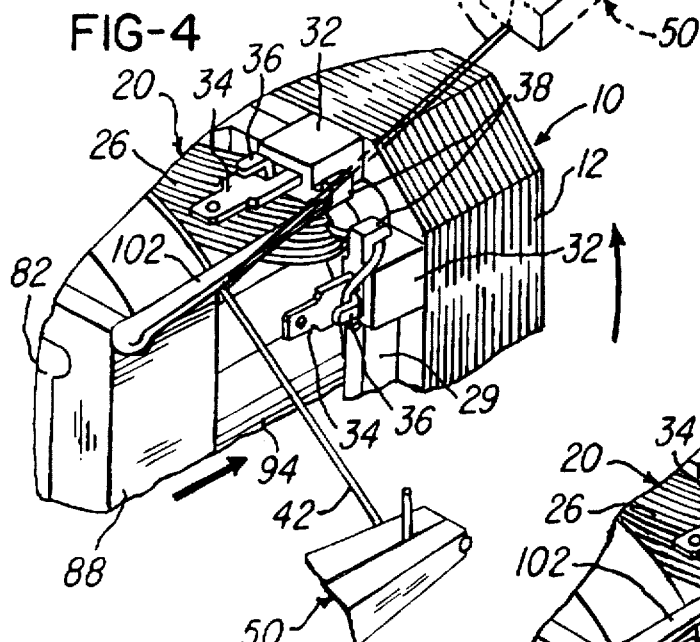
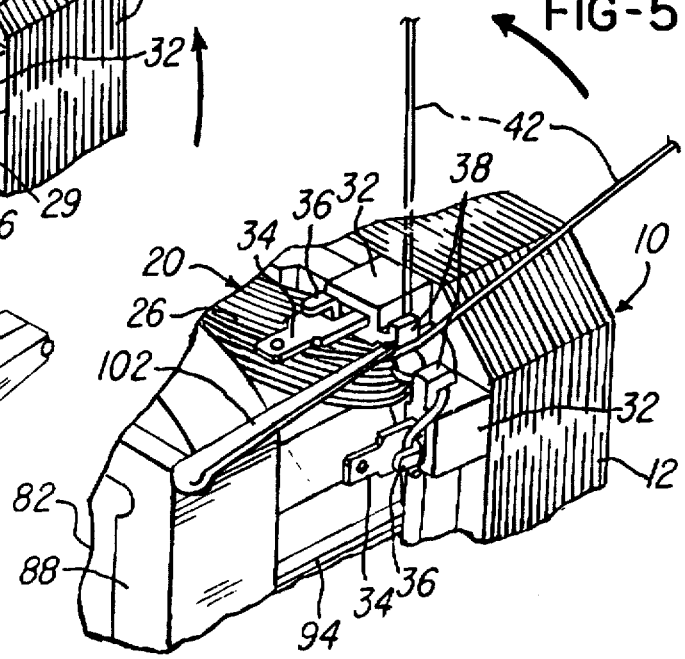

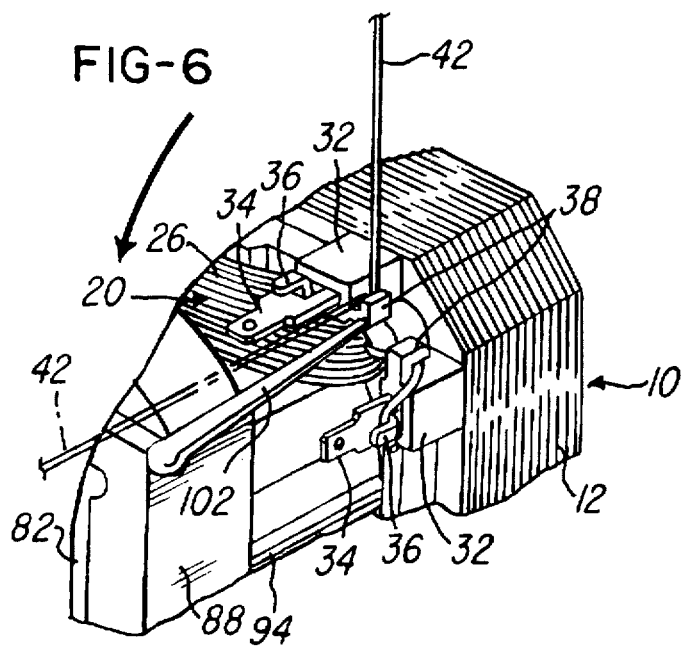
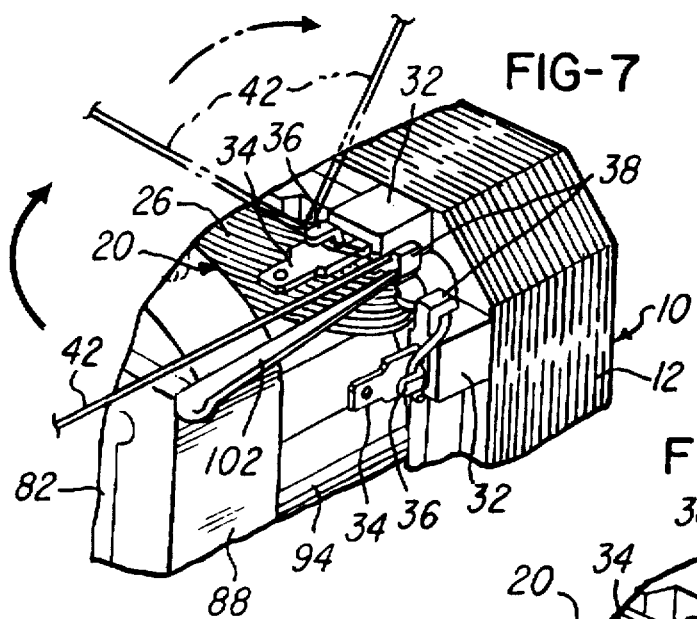
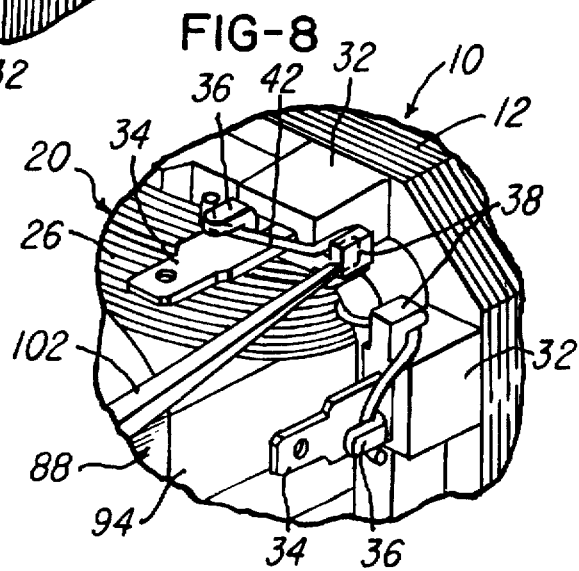

STATOR LEAD WIRE CONNECTING METHOD

FIELD OF THE INVENTION

This invention relates to the art of manufacturing stators for electric motors and more particularly to a stator coil lead wire connecting method and apparatus for enabling a stator coil lead wire to be aligned with and connected to a terminal or terminal receptacle on an end face of a stator core.

INCORPORATION BY REFERENCE

The disclosures of U.S. Pat. Nos. 4,951,379; 5,090,107; and 5,090,108 are hereby incorporated by reference herein.

BACKGROUND OF THE INVENTION

Many stators include a stator core on which are mounted terminal boards with terminal-receiving receptacles which have terminals lodged in them or which have slots for receiving lead wires and in which terminals are inserted at a later stage in the manufacturing process. (As will become apparent, there are aspects of this invention in which it is immaterial whether a stator coil lead wire is to be directly connected to a terminal mounted on the stator core or inserted into slots in a terminal receptacle on the stator core. Accordingly, the term "terminal members" as used herein is intended to refer either to a terminal which projects from the stator core or to a terminal-receiving receptacle to which a terminal is to be connected at a later stage in the manufacture of the stator.) When manufacturing stators having such terminal members, a common practice is to wind coils on a stator core at a winding station and, during the winding process, insert the stator coil lead wires into temporary wire clamps. The wound stator core is then transferred along with the temporary wire clamps to a lead connect or robot station and, using an end effector of an industrial robot, the stator coil lead wires are manipulated to connect them to the terminal members. Examples of terminal connection methods used to connect stator coil lead wires to terminal members having tangs are disclosed in the aforementioned U.S. Pat. Nos. 4,951,379; 5,090,107; and 5,090,108.

Occasions arise when, due to particular terminal board constructions, particular terminals, or particular lead wire configurations, wire-guiding tooling assemblies cooperate with the robot to guide the lead wires as needed to effect connections to terminal members. Examples of such tooling assemblies are the tooling assembly 50 and the tooling assembly 262 illustrated, respectively, in the aforementioned U.S. Pat. Nos. 5,090,107 and 5,090,108.

Stator coil lead wires are often extended from a side of a wound coil directly to a terminal-receiving receptacle or terminal located close to the side of the coil from which the lead wire extends, and connections of such lead wires to the terminal members can usually be accomplished by relatively simple movements of a three axis industrial robot. However, in some cases, a lead wire extends from one side of the wound coil to a remotely-located terminal member. The latter cases may be difficult or impossible to handle by the use of a three axis industrial robot, particularly if the lead wire has to extend completely over an end turn of the coil from which it leads. Controlling the manner in which the lead wire extends over the coil end turn may be difficult and the path of the lead wire between one side of the coil and the other may be different from one stator to the next. In essentially every case, the path along which the lead wires lies over the coil end turn cannot be predicted with certainty because of differences that occur in the shapes of the end turns and because the end turn surface, being made from numerous overlapping turns of wire, is unevenly ridged so that the lead wire in some cases will lie closer to the core than in other cases. In extreme cases, the lead wire will occasionally move out of engagement with the coil end turn into the center area of the stator intended to receive an armature.

Some stators have narrow gaps between adjacent terminal members through which lead wires must be coursed. The uncertain position of lead wires extended to remotely located terminal members over coil end turns renders particularly difficult the routing of the lead wires through such narrow gaps because the lead wire positions relative to the coil end turns is not uniform from stator to stator and because the positions of a lead wire changes as the robot attempts to lay the lead wire in a narrow gap located remotely from the coil side from which the lead wire extends.

SUMMARY OF THE INVENTION

In accordance with this invention, a stator coil lead wire is extended over the end turns of a coil from which the lead wire is extended and inserted into a terminal member adjacent the opposite side of the same coil. A tooling assembly is provided having a coil shield which prevents the lead wire from becoming disengaged from the coil end turns and moving toward the center of the stator core. Additionally, a wire guide finger is provided which is movable toward and away from the stator core for enabling the lead wire to be inserted between closely spaced terminal members.

Other objects and advantages will become apparent from the following description and the drawings.

BRIEF DESCRIPTION OF THE DRAWINGS

FIG. 1 is a partly exploded, fragmentary, partly schematic, perspective view of a lead connect station of a stator winding machine which includes a presently preferred tooling assembly in accordance with this invention, a stator with which this invention may be used, wire clamps that temporarily hold the lead wires extending from the stator coils, and a portion of a robot end effector used for connecting the lead wires to the stator terminal members.

FIG. 2 is an enlarged, fragmentary, perspective view of the stator, a portion of the tooling assembly and the robot end effector of FIG. 1. FIG. 2 illustrates a step taken to connect one of the stator coil lead wires to a terminal member.

FIG. 3 is a fragmentary, perspective view similar to FIG. 2 but showing a subsequent step taken to connect the stator coil lead wire to the terminal member.

FIG. 4 is a fragmentary, perspective view of the robot end effector and a portion of the stator and the tooling assembly shown in FIGS. 2 and 3 but showing a still later step taken to connect the stator coil lead wire to the terminal member.

FIGS. 5 through 8 are fragmentary perspective views of generally the same parts of the stator and the tooling assembly shown in FIG. 4 and illustrate successive additional steps taken to connect the stator coil lead wires to the terminal member.

DETAILED DESCRIPTION

With reference to FIGS. 1 and 2, this invention is directed to the manufacture of a stator, generally designated 10, comprising a laminated core 12 formed to include a central bore 14 and pole pieces 16 (only one of which is illustrated) around which coils 20 and 22 of magnet wire are wound. Each coil 20 and 22 has sides which extend axially through the stator core 12 and end turns, designated 26, which extend over a coil support 28 that forms part of a plastic end piece or terminal board, generally designated 29, affixed to the stator core. The outermost end of each of the coil supports 28 has a radially outwardly extending tooth or coil retainer 30. Plural terminal sockets 32, which are integrally formed with the plastic end piece or terminal board 29, project axially outwardly of the stator core 12. In the particular embodiment illustrated in the drawings, there are eight terminal sockets 32, two at each corner of the stator core 12. At an earlier stage in the manufacture of the stator 10, metal terminals 34 having tangs 36 are lodged into four of the sockets 32, namely the four sockets 32 located at the upper right corner and at the lower left corner of the face of the stator core 12 as viewed in FIGS. 1 and 2. The sockets 32 are each provided with an integral cleat or anchor 38 having spaced surfaces defining a channel or trough into which stator coil lead wires are extended as will be described below.

In an earlier stage of manufacture of the stator 10, the coils 20 and 22 were wound starting with lead wires (called start wires) 40 and 44 and finishing with lead wires (called finish wires) 42 and 46. At the same stage, the lead wires 40, 42, 44 and 46 were inserted into lead wire-retaining temporary clamps 48, only two of which are illustrated in FIG. 1, which releasably and temporarily hold the lead wires in preparation for later connection to the terminals 34. It will be observed in FIG. 1 that the right side lead wire 40 of the upper stator coil 20 extends from the right side of the stator coil 20 upwardly between the two terminal sockets 32 located at the upper right corner of the stator core 12 to the upper right side temporary clamp 48. Similarly, the left side lead wire 42 of the upper stator coil 20 extends from the left side of the stator coil 20 upwardly between the two terminal sockets 32 located at the upper left corner of the stator core 12 to the upper left side temporary clamp 48. The lead wires 44 and 46 likewise extend downwardly from the respective sides of the lower stator coil 22 between their respective nearest closest pair of terminal sockets 32 to their associated temporary clamps (not shown).

This invention is directed primarily to a later stage in the manufacture of the stator 10, which may be termed the "lead-connect" stage, which is carried out at a lead-connect or robot station. This is the station diagrammatically illustrated in FIG. 1. At this station, the stator 10 is supported on a suitable support (not shown) which may be part of a support track as shown, for example, in U.S. Pat. No. 5,090,108, or else a support member on a turret as shown, for example, in U.S. Pat. No. 5,370,324.

With continued reference to FIGS. 1 and 2, a tooling assembly, generally designated 80, is used in the practice of this invention, which comprises a vertical support arm 82 which is mounted for sliding movement on a base 84 for movement of the tooling assembly 80 axially toward and away from the stator core 12 at the lead-connect station. An air actuator, shown schematically at 86 in FIG. 1, is provided to axially move the tooling assembly 80 for purposes which will be described below. The tooling assembly 80 further includes a coil shield plate 88 having a relieved rear face 90 which receives the top of the support arm 82, and a cylindrical, forwardly extending arbor 94 adapted to enter into the bore of the stator core 12 to secure its position and to provide added support for the coil end turns 26 during the lead wire connecting operations. The rear face of the arbor 94 has a tapped hole (not shown) that receives a mounting screw 96 which holds the parts of tooling assembly 80 together.

In accordance with this invention, the coil shield plate 88 has a front face, i.e. the face confronting the stator core 12 at the lead connect station, which has a pair of recessed pockets 100 shaped and located to receive the coil retainers 30 when the tooling assembly 80 is advanced into engagement with the stator 10 at the lead connect station, as shown in FIG. 2. Furthermore, the front face of the coil shield plate 88 extends above the upper coil retainer 30 and the lower coil retainer 30. In addition, the tooling assembly 80 has an elongate lead guide finger 102 which projects generally parallel to the horizontal center axis of the stator core 10 at the lead connect station from the upper right side (as viewed in FIG. 1) of the coil shield plate 88 toward and near to the terminal board 29 adjacent the anchor 38 integrally formed on the top right socket 32. The lead guide finger 102 can conveniently be affixed to the coil shield plate 88 in any suitable fashion, as by welding. A second, lead guide finger (not shown), which is hidden from view by the other parts of the tooling assembly 80, and which may be essentially identical to the illustrated lead guide finger 102, projects generally parallel to the horizontal center axis of the stator core 12 at the lead connect station from the lower left side (as viewed in FIG. 1) of the coil shield plate 88 toward and near to the terminal board 29 adjacent the anchor 38 integrally formed on the bottom left socket 32.

At the lead connect station, a robot having a pliers-like end effector 50 grips a first one of the lead wires, for example lead wire 40, and moves in such a manner as to withdraw the lead wire from its associated temporary clamp 48. The robot is preferably a three axis industrial robot. By appropriate manipulations of the end effector 50, the lead wire 40 is extended behind the anchor 38 of the terminal socket 32 which is located closely adjacent the right side of the upper coil 20 and on the right side of the face of the terminal board 29. By continued movements of the end effector 50, the lead wire 40 is extended part way around the tang 36 of the terminal 34 lodged in the upper right side terminal socket 32. The lead wire 40 is then severed closely adjacent the tang 36, either by an appropriate cutter (not shown) or by breaking the wire 40 against an edge of the tang in the manner described in the aforementioned U.S. Pat. No. 4,951,379. The manipulations of the robot end effector required to connect the lead wire 40 to the upper right side terminal member may be straightforward well within the skill of one familiar with the use of industrial robots for connecting stator coil lead wires to terminal members, and are not illustrated or further described herein. The same is true for the subsequent connection of the lead wire 44 to the lower left side terminal 34.

This invention is directed to the more difficult task of connecting the upper left side lead wire 42 to the terminal 34 located at the right end of the top of the face of the stator core 10 and to connecting the lower right side lead wire 46 to the terminal 34 located at the left end of the bottom of the face of the stator core 12. Here, it may be noted that the upper right side wire 40 must be connected to its terminal 34 before the upper left side lead wire 42 is connected to its terminal 34 and the lower left side lead wire 44 must be connected to its terminal 34 before the lower right side lead wire 46 is connected to its terminal 34. Otherwise, the lead wires 40 and 44 would interfere with the operations described below. It will be apparent to those familiar with the art that the manipulations of the apparatus, for connecting the lower right side lead wire 46 to its terminal 34 are essentially the same, but in a reverse or mirror image, to the manipulations described below required to connect the upper left side lead wire 42 to its terminal 34. Therefore, only the latter manipulations are illustrated herein.

Referring now to FIGS. 2 through 8, the tooling assembly 80 is moved toward the stator core 12 at the lead wire connect station immediately after the stator core reaches that station. After the start wire 40 is connected to its terminal 34, the end effector 50 grips the upper left side lead wire or finish wire 42 between the stator coil 20 and its associated temporary clamp 48. The end effector 50 is then manipulated to remove the lead wire 42 from its temporary clamp 48 and to extend the lead wire 42 over the top of the end turns 26 of the coil 20 and over the top of the wire guide finger 102, after which the end effector 50 and the lead wire 42 have reached the positions thereof shown in FIG. 2. When the end effector 50 moves to extend the lead wire 42 over the end turns 26, it must be sufficiently spaced from the stator core 12 to stay clear of the upper right side terminals 34. During this time, the coil shield plate 88 prevents the lead wire 42 from falling off the coil support 28 toward the center of the stator core 12.

As shown in FIG. 3, the tooling assembly 80 is then retracted sufficiently to enable the lead wire 42 to move between the upper right side terminals 34 and the free end of the lead guide finger 102. The end effector 50 is then moved downwardly toward the horizontal plane extending through the center of the stator core 12 so that the lead wire 42 is brought below the level of the lead guide finger 102. Immediately thereafter, as shown in FIG. 4, the tooling assembly is again moved toward the stator core 12, which causes the wire guide finger 102 to be located over the lead wire 42. This locates the lead wire 42 in a position such that, by combined horizontal and vertical movements of the end effector 50, the lead wire 42 is accurately positioned so that it can be inserted into the channel in the anchor 38 of the upper right terminal socket 32, and then into the associated terminal 34, following a pattern of movements evident from FIGS. 4 through 8.

The precise location of the free ends of the coil guide fingers 102 may vary depending upon the particular configuration of the stator core and the coils wound thereon but, in general, they will be closely adjacent the channels or other parts of the terminal members into which the lead wires are first extending so that the position of the portions of the lead wires extended over the coil end turns can be accurately established closely adjacent the terminal members.

Although the presently preferred embodiments of this invention have been described, it will be understood that within the purview of this invention various changes may be made within the scope of the appended claims.

Having thus described our invention, we claim:

1. A method for manufacturing a stator having a stator core having an end face with plural terminal members extending axially of said stator core and adapted to receive stator coil lead wires, each of said terminal members having confronting surfaces between which a stator coil lead wire may be inserted, said stator further having plural lead wires, each said lead wire having a fixed end extending from a stator coil wound on said stator core and a free end releasably held by a clamp, said method comprising the steps of:

providing a tooling assembly movable along a predetermined axis, said tooling assembly having a coil shield plate for shielding the end turns of the stator coils confronting the tooling assembly;

locating a stator core on which stator coils have been wound in a predetermined position spaced from said tooling assembly with a lead wire extending from one of said stator coils to a temporary wire clamp;

said tooling assembly further including a support member and a lead wire guide finger projecting therefrom which spans between said support member and said stator core;

moving said tooling assembly toward said stator core so that said coil shield plate engages confronting end turns of the stator coils;

gripping said lead wire intermediate said clamp and said coil by a pliers-like robot end effector;

moving said end effector to remove said lead wire from said clamp, to extend said lead wire over the end turn of the stator coil from which it extends, and to insert said lead wire between the confronting surfaces of one of said terminal members;

said method further comprising, before inserting said lead wire between the confronting surfaces of said one terminal member, the steps of:

extending said lead wire over said guide finger;

moving said tooling assembly away from said stator core by a distance sufficient to permit said end effector to move said lead wire below the level of said guide finger;

moving said lead wire below said guide finger; and moving said tooling assembly toward said stator core so that said guide finger overlies said lead wire.

2. A method for manufacturing a stator having a stator core having an end face with plural terminal members extending axially of said stator core and adapted to receive stator coil lead wires, each of said terminal members having confronting surfaces between which a stator coil lead wire may be inserted, said stator further having plural lead wires, each said lead wire having a fixed end extending from a stator coil wound on said stator core and a free end releasably held by a clamp, said method comprising the steps of:

providing a tooling assembly movable along a predetermined axis, said tooling assembly having a support member and a lead wire guide finger which projecting therefrom;

locating a stator core on which stator coils have been wound in a predetermined position spaced from said tooling assembly with a lead wire extending from one of said stator coils gripped by a pliers-like robot end effector;

advancing said tooling assembly toward said stator core so that said guide finger spans between said support member and said stator core;

extending said lead wire over said guide finger;

retracting said tooling assembly away from said stator core by a distance sufficient to permit said lead wire to be moved below said guide finger;

moving said lead wire below said guide finger; and advancing said tooling assembly toward said stator core so that said guide finger overlies said lead wire.

3. The method of claim 2 further comprising the step of extending said lead wire into a terminal member after said guide finger overlies said lead wire.

* * * * *